(12) United States Patent
Shimano et al.

(10) Patent No.: US 11,958,783 B2
(45) Date of Patent: Apr. 16, 2024

(54) COMPOSITION, FILM, AND METHOD FOR PRODUCING FILM

(71) Applicant: Sumitomo Chemical Company, Limited, Tokyo (JP)

(72) Inventors: Satoshi Shimano, Tsukuba (JP); Atsunori Doi, Tsukuba (JP); Fumio Tamura, Tokyo (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 816 days.

(21) Appl. No.: 16/648,091

(22) PCT Filed: Sep. 19, 2018

(86) PCT No.: PCT/JP2018/034592
§ 371 (c)(1),
(2) Date: Mar. 17, 2020

(87) PCT Pub. No.: WO2019/059212
PCT Pub. Date: Mar. 28, 2019

(65) Prior Publication Data
US 2020/0262760 A1    Aug. 20, 2020

(30) Foreign Application Priority Data
Sep. 22, 2017   (JP) .................................. 2017-182253

(51) Int. Cl.
*C04B 35/63* (2006.01)
*C04B 35/50* (2006.01)
(Continued)

(52) U.S. Cl.
CPC .......... *C04B 35/6316* (2013.01); *C04B 35/50* (2013.01); *C04B 35/63448* (2013.01);
(Continued)

(58) Field of Classification Search
CPC . C04B 12/04; C04B 28/26; C04B 2235/9607; C04B 2235/483;
(Continued)

(56) References Cited

U.S. PATENT DOCUMENTS

2018/0148376 A1 *  5/2018  Ben-Nissan ............ C04B 35/01
2019/0112227 A1 *  4/2019  Skorina ................. C04B 14/305

FOREIGN PATENT DOCUMENTS

CN        105931857 A  *  9/2016
CN        106167693 A  * 11/2016  ............... C09K 5/14
(Continued)

OTHER PUBLICATIONS

CN106167693A machine translation (Year: 2016).*
(Continued)

*Primary Examiner* — Bryan D. Ripa
*Assistant Examiner* — Cameron K Miller
(74) *Attorney, Agent, or Firm* — Morgan, Lewis & Bockius LLP

(57) ABSTRACT

A composition including a binder and a variable thermal conductivity material satisfying a conditional expression 1, wherein a content of the variable thermal conductivity material is from 300 parts by weight to 10,000 parts by weight with respect to a content of 100 parts by weight of the binder:

$$\kappa_{max}/\kappa_{25} \geq 1.2 \qquad \text{[conditional expression 1]}$$

(wherein, $\kappa_{25}$ represents a thermal conductivity at 25° C., and $\kappa_{max}$ represents the maximum value of a thermal conductivity at 200° C. or 500° C.).

15 Claims, 1 Drawing Sheet

(51) Int. Cl.
*C04B 35/634* (2006.01)
*C09K 5/14* (2006.01)

(52) U.S. Cl.
CPC ........ *C09K 5/14* (2013.01); *C04B 2235/3201* (2013.01); *C04B 2235/483* (2013.01); *C04B 2235/9607* (2013.01)

(58) Field of Classification Search
CPC ...... C04B 2235/3201; C04B 35/63448; C04B 35/50; C04B 35/6316; C09K 5/14
See application file for complete search history.

(56) References Cited

FOREIGN PATENT DOCUMENTS

| | | | |
|---|---|---|---|
| CN | 106167693 | A | 11/2016 |
| CN | 106876149 | A * | 6/2017 |
| EP | 3042885 | A1 | 7/2016 |
| JP | S63-153386 | A | 6/1988 |
| JP | H11-236636 | A | 8/1999 |
| JP | 2002-299534 | A | 10/2002 |
| JP | 2013-234244 | A | 11/2013 |
| JP | 2016-056352 | A | 4/2016 |
| JP | 2016-084271 | A | 5/2016 |
| JP | 2017-135279 | A | 8/2017 |
| WO | 2015/030238 | A1 | 3/2015 |
| WO | 2016/152688 | A1 | 9/2016 |

OTHER PUBLICATIONS

CN105931857A machine translation (Year: 2016).*
CN106876149A machine translation (Year: 2017).*
Decision of Rejection issued in related Chinese Patent Application No. 201880060784.3 dated Dec. 20, 2021.
Office Action issued in related Chinese Patent Application No. 201880060784.3 dated Jan. 13, 2021.
Office Action issued in related Chinese Patent Application No. 201880060784.3 dated Jul. 16, 2021.
International Search Report issued in corresponding International Patent Application No. PCT/JP2018/034592 dated Dec. 4, 2018.

* cited by examiner

40
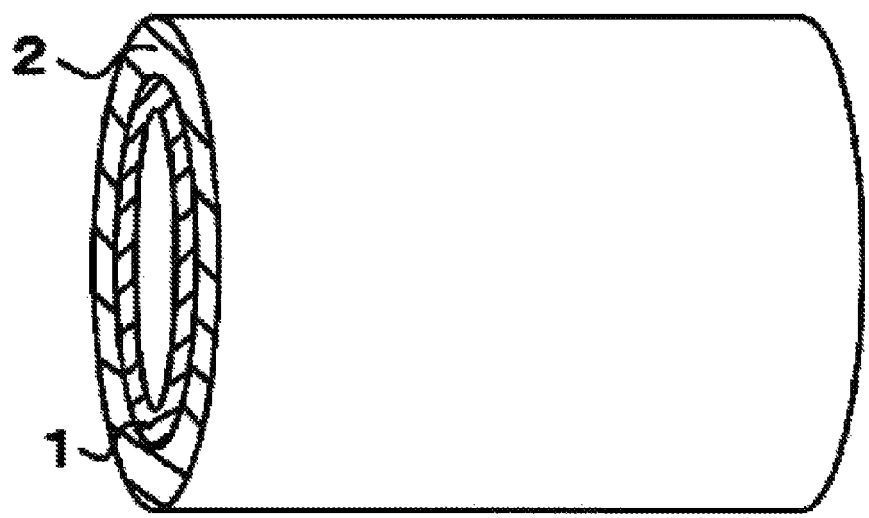

COMPOSITION, FILM, AND METHOD FOR PRODUCING FILM

TECHNICAL FIELD

The present invention relates to a composition, a film, and a method for producing a film.

Priority is claimed on Japanese Patent Application No. 2017-182253, filed Sep. 22, 2017, the content of which is incorporated herein by reference.

BACKGROUND ART

In recent years, effective use of thermal energy has been required due to carbon dioxide emission regulations and energy issues. For example, in an automobile, the periphery of the exhaust catalyst tends to get warm quickly when the engine is started, and is kept warm for a long time when the engine is stopped, so that it becomes possible to efficiently use the thermal energy while suppressing the excessive release of thermal energy. This is expected to lead to a reduction in the amount of carbon dioxide emissions and an improvement in fuel consumption.

As such a thermal energy control technique, for example, a heat dissipation adjustment structure has been known in which a material whose thermal resistance changes is provided around a heat generation source, and the heat conduction of the material changes depending on the temperature (Patent Document 1).

CITATION LIST

Patent Document

[Patent Document 1] International Publication No. 2016/152688

SUMMARY OF INVENTION

Technical Problem

However, the material used for the aforementioned heat dissipation adjustment structure does not have sufficient adhesion to an object to be applied, and furthermore, it cannot be applied to those with complicated shapes such as curved surfaces and has poor shape processability.

Accordingly, an object of the present invention is to provide a composition or the like that is useful as a material having a variable thermal conductivity (variable thermal conductivity material) and the like, has excellent adhesion to an object to be applied, and also has excellent shape processability.

Solution to Problem

The present invention includes the following aspects [1] to [9].

[1] A composition including a binder and a variable thermal conductivity material satisfying a conditional expression 1, wherein
a content of the aforementioned variable thermal conductivity material is from 300 parts by weight to 10,000 parts by weight with respect to a content of 100 parts by weight of the aforementioned binder:

$$\kappa_{max}/\kappa_{25} \geq 1.2 \qquad \text{[conditional expression 1]}$$

(In the formula, $\kappa_{25}$ represents a thermal conductivity at 25° C., and $\kappa_{max}$ represents the maximum value of a thermal conductivity at 200° C. or 500° C.)

[2] The composition according to [1], wherein the aforementioned binder is a silicone or an alkali silicate.

[3] The composition according to [1] or [2], further including an inorganic compound other than the aforementioned binder and the aforementioned variable thermal conductivity material.

[4] The composition according to any one of [1] to [3], further including a solvent.

[5] The composition according to [4], wherein the aforementioned solvent is water or a glycol ester.

[6] A film obtained by curing the composition according to any one of [1] to [5].

[7] A heat flow control member including a base material and the film according to [16].

[8] The heat flow control member according to [7], wherein the aforementioned base material includes a compound satisfying a conditional expression 2:

$$\kappa_{min}/\kappa_{25} \leq 0.8 \qquad \text{[conditional expression 2]}$$

(In the formula, $\kappa_{25}$ represents a thermal conductivity at 25° C., and $\kappa_{min}$ represents the minimum value of a thermal conductivity at 200° C. or 500° C.)

[9] A method for producing a film, including: obtaining a film by crosslinking and curing after evaporating a solvent from the composition according to [4] or [5].

Advantageous Effects of Invention

According to the present invention, there can be provided a composition that is useful as a variable thermal conductivity material and the like, has excellent adhesion to an object to be applied, and also has excellent shape processability (for example, applicable to curved surfaces without generating cracks); a film obtained by curing the aforementioned composition; and a method for producing the aforementioned film.

BRIEF DESCRIPTION OF DRAWINGS

FIG. 1 is a view showing an embodiment in which a film of the present invention is formed in a peripheral portion of a heat flow pipe.

DESCRIPTION OF EMBODIMENTS

Hereinafter, the present invention will be described in detail, but the present invention is not limited to the following embodiments and can be carried out with various modifications within the scope of the gist thereof.

In the present invention, the thermal conductivity of a compound constituting a variable thermal conductivity material and a base material is a value measured using a laser flash method by preparing a pellet having a diameter of 10 mm and a thickness of 1 mm.

<Composition>

A composition according to an embodiment of the present invention includes a binder and a variable thermal conductivity material satisfying a conditional expression 1.

(Variable Thermal Conductivity Material)

In the present specification, the term "variable thermal conductivity material" means a material capable of changing the thermal conductivity in an environment of a certain temperature, pressure, magnetic field, electric field or the like where the material is placed.

In one aspect, the variable thermal conductivity material in the present specification is a material satisfying the [conditional expression 1] of $\kappa_{max}/\kappa_{25} \geq 1.2$.

In the variable thermal conductivity material, the ratio $\kappa_{max}/\kappa_{25}$ preferably satisfies an expression: $\kappa_{max}/\kappa_{25} \geq 1.5$, more preferably satisfies an expression: $\kappa_{max}/\kappa_{25} \geq 2.0$, and still more preferably satisfies an expression: $\kappa_{max}/\kappa_{25} \geq 2.4$. The variable thermal conductivity material satisfies an expression of $\kappa_{max}/\kappa_{25} \leq 100$.

That is, in one aspect, the variable thermal conductivity material according to the present invention is a material satisfying an expression of $1.2 \leq \kappa_{max}/\kappa_{25} \leq 100$, preferably an expression of $1.5 \leq \kappa_{max}/\kappa_{25} \leq 100$, more preferably an expression of $2.0 \leq \kappa_{max}/\kappa_{25} \leq 50$, and still more preferably an expression of $2.4 \leq \kappa_{max}/\kappa_{25} \leq 10$.

In another aspect, an expression of $2.1 \leq \kappa_{max}/\kappa_{25} \leq 2.7$ may be satisfied.

Examples of the variable thermal conductivity material include inorganic compounds, preferably alloys, chalcogenides, oxides, silicon carbide, aluminum nitride, silicon nitride, diamond, graphene, graphite, carbon nanotubes, and carbon nanowires, and more preferably oxides. It should be noted that the variable thermal conductivity material may further have a property of greatly changing the electrical conductivity with a temperature change.

Examples of the shape of the variable thermal conductivity material include particle-like shapes, needle-like shapes, fiber-like shapes and plate-like shapes, and particle-like shapes (particularly spherical shapes) are preferable.

When the variable thermal conductivity material is in the form of particles, the median diameter of the variable thermal conductivity material measured by a laser diffraction method is preferably from 10 nm to 100 μm, more preferably from 13 nm to 50 μm, and still more preferably from 15 nm to 30 μm, because the packing density into the binder and the thermal conductivity of the variable thermal conductivity material are improved.

When the variable thermal conductivity material is in the form of particles, by increasing the surface area of the variable thermal conductivity material, it is possible for the particles of the variable thermal conductivity material to efficiently exchange heat with the binder and other components. Therefore, the BET specific surface area of the variable thermal conductivity material is preferably from $0.10 \text{ m}^2/\text{g}$ to $500 \text{ m}^2/\text{g}$, more preferably from $0.12 \text{ m}^2/\text{g}$ to $10 \text{ m}^2/\text{g}$, and still more preferably from $0.13 \text{ m}^2/\text{g}$ to $0.25 \text{ m}^2/\text{g}$.

The BET specific surface area can be measured using, for example, a BET specific surface area measuring device (Macsorb HM-Model 1201 manufactured by Mountech Co., Ltd.).

Examples of the alloy include NiMo alloys and AlCuFe alloys, preferably AlCuFe alloys, and more preferably $Al_{62.5}Cu_{25}Fe_{12.5}$, $Al_{61.5}Cu_{26.5}Fe_{12}$, $Al_{63}Cu_{25}Fe_{12}$, $Al_{62.5}Cu_{25.5}Fe_{12}$, $Al_{63}Cu_{24}Fe_{13}$, $Al_{62}Cu_{25.5}Fe_{12.5}$ and $Al_{62.5}Cu_{24.5}Fe_{13}$.

Examples of the oxide include metal oxides (for example, metal oxides represented by $M_yO_z$) and composite metal oxides (for example, composite metal oxides represented by $A_xM_yO_z$). Here, A represents at least one element selected from the group consisting of alkali metals, alkaline earth metals, Sc, Y and rare earth elements, M represents at least one metal element selected from Groups 3 to 15 of the periodic table as defined by IUPAC, and x, y and z each independently represent a positive number.

M is preferably a transition element, more preferably a transition element having a d electron, and still more preferably titanium, vanadium, manganese, iron, cobalt, or nickel.

Examples of the oxide in which M is titanium include $Ti_2O_3$, $Ti_3O_5$, and Magneli phase titanium oxides $Ti_nO_{2n-1}$ (in the formula, n is an integer of 4 or more).

Examples of the oxide in which M is vanadium include $VO_2$ and $V_2O_3$.

Examples of the oxide in which M is manganese include $LaMnO_3$, $SrMnO_3$, $La_{1-a}Sr_aMnO_3$, and $La_{1-a}Ca_aMnO_3$ (in the formulae, a is a number from 0 to 1).

Examples of the oxide in which M is iron include $CaFeO_3$.

Examples of the oxide in which M is cobalt include $LaCoO_3$. This oxide may be doped with, for example, strontium or calcium. Examples of the oxide in which M is cobalt include $La_{1-x}Sr_xCoO_3$ and $La_{1-x}Ca_xCoO_3$ (in the formulae, x is a number from 0 to 1). x is preferably a number from 0 to 0.30, more preferably a number from 0 to 0.20, still more preferably a number from 0.02 to 0.10, and particularly preferably a number from 0.02 to 0.07 because the change in thermal conductivity from 25° C. to 500° C. becomes large.

Examples of the oxide in which M is nickel include $RNiO_3$ (in the formula, R represents La, Pr, Nd, or Sm).

One type of the variable thermal conductivity material may be used alone, or two or more types thereof may be used in combination.

The content of the variable thermal conductivity material in the composition of the present embodiment is preferably from 500 parts by weight to 9,000 parts by weight, more preferably from 510 parts by weight to 1,200 parts by weight, still more preferably from 800 parts by weight to 1,100 parts by weight, or may be from 520 parts by weight to 8,330 parts by weight with respect to the content of 100 parts by weight of the binder. When the content of the variable thermal conductivity material is less than 300 parts by weight, cracks may occur in the film, and when it exceeds 10,000 parts by weight, the adhesion of the film may be lowered.

In one aspect, the content of the variable thermal conductivity material in the composition of the present embodiment is preferably from 39.0 to 99.0% by weight with respect to the total weight of the composition.

(Binder)

In the present specification, the term "binder" (generally also referred to as "binding agent") means a material having a function of dispersing a variable thermal conductivity material and adhering to a base material.

Examples of the binder include organic binders such as epoxy resins, phenol resins, polyethylene naphthalate, polyethersulfone, and liquid crystal polymers; alkali silicates such as lithium silicate, sodium silicate, and potassium silicate; and silica glass and silicones. As the binder, silica glass, alkali silicates, and silicones are preferable because of excellent heat resistance, and furthermore alkali silicates and silicones are more preferable, and silsesquioxane is still more preferable because of excellent coating properties and stress relaxation characteristics.

Examples of the alkali silicate include lithium silicate, sodium silicate, and potassium silicate, and sodium silicate is preferable.

The alkali silicate is represented by, for example, $M'_2O \cdot nSiO_2$ (in the formula, M' represents an alkali metal and n is a number from 1 to 3.5). n is preferably a number from 1.5 to 3.0 because of excellent coating properties and adhesion.

The silicone preferably contains at least one structure selected from the group consisting of a crosslinked structure and a crosslinking group. In the present specification, the term "crosslinking group" is a group capable of forming a crosslinked structure, and examples thereof include a hydroxyl group and an alkoxy group. In the present specification, a repeating unit including a silicon atom in which three bonds out of four bonds of the silicon atom are bonded to an oxygen atom is referred to as a "T unit". In particular, when x oxygen atoms (x is an integer of 1 to 3) among the three oxygen atoms bonded to a silicon atom are further bonded to other silicon atoms, this repeating unit is referred to as a "Tx unit". The term "T unit" includes a "T1 unit", a "T2 unit", and a "T3 unit". Among the "T units", "T3 units" form three-dimensional crosslinked structures. Further, a silicon atom contained in a "T3 unit" is referred to as a "T3 silicon atom".

In the present specification, a repeating unit including a silicon atom in which all four bonds of the silicon atom are bonded to an oxygen atom is referred to as a "Q unit". In particular, when x' oxygen atoms (x' is an integer of 1 to 4) among the four oxygen atoms bonded to a silicon atom are further bonded to other silicon atoms, this repeating unit is referred as a "Qx' unit". The term "Q unit" includes a "Q1 unit", a "Q2 unit", a "Q3 unit", and a "Q4 unit". Among the "Q units", "Q3 units" and "Q4 units" form three-dimensional crosslinked structures. Further, the silicon atoms contained in the "Q4 unit" and the "Q3 unit" are referred to as a "Q4 silicon atom" and a "Q3 silicon atom", respectively.

The film according to an embodiment of the present invention preferably contains a crosslinked structure. That is, the silicone preferably contains any one of a "T3 unit", a "Q3 unit", and a "Q4 unit", or has a crosslinking group.

In the silicone, the total amount of T3 silicon atoms, Q4 silicon atoms and Q3 silicon atoms with respect to all silicon atoms is preferably 10 mol % or more, more preferably 30 mol % or more, and still more preferably 50 mol % or more. This is because, since the presence of 10 mol % or more thereof allows the variable thermal conductivity material to be dispersed in the silicone cross-linked structure to obtain a film having a dense and stable structure with a small number of voids, the temperature change of the thermal conductivity of the variable thermal conductivity material is sufficiently reflected even in the film. When the total amount satisfies such a range, the variable thermal conductivity material is incorporated into the cross-linked structure, the variable thermal conductivity material can be filled to a higher degree, and moreover, the heat exchange between the variable thermal conductivity material and the binder becomes more efficient. In the silicone, the total amount of T3 silicon atoms, Q4 silicon atoms and Q3 silicon atoms with respect to all silicon atoms is 99 mol % or less.

That is, in one aspect, in the silicone, the total amount of T3 silicon atom, Q4 silicon atom and Q3 silicon atom with respect to all silicon atoms is 10 mol % or more and 99 mol % or less, more preferably 30 mol % or more and 99 mol % or less, and still more preferably 50 mol % or more and 99 mol % or less.

In the present specification, the content of the Q4 silicon atoms can be determined as a ratio of the area of a signal attributed to the Q4 silicon atoms with respect to the total area of signals of all silicon atoms determined by $^{29}$Si-NMR measurement. The contents of Q3 silicon atoms and T3 silicon atoms can also be determined by the same method.

Examples of the silicone include silicone resins such as addition polymerization type silicone resins, polycondensation type silicone resins, and dual type silicone resins having properties of both addition polymerization type silicone resins and polycondensation type silicone resins.

Examples of the addition polymerization type silicone resins include methyl silicone resins, phenyl silicone resins, and methyl phenyl silicone resins, and methyl silicone resins are preferable because of excellent heat resistance.

Commercially available products can also be used as the addition polymerization type silicone resin. More specifically. OE-6250, OE-6336, and OE-6301, which are methyl silicone resin sealants manufactured by Dow Corning Toray Co., Ltd.; OE-6450, OE-6520, OE-6550, OE-6631, OE-6636, OE-6635. OE-6630, and OE-6665N, which are phenyl silicone resin sealants or methyl phenyl silicone resin sealants manufactured by Dow Corning Toray Co., Ltd.; IVS4321, XE14-C2042, IVS4542, IVS4546, IVS4622, IVS4632, IVS4742, IVS4752, IVSG3445, IVSG5778, and IVSG0810, which are methyl silicone resin sealants manufactured by Momentive Performance Materials Japan LLC; XE14-C2860 and XE14-C3450, which are phenyl silicone resin sealants or methyl phenyl silicone resin sealants manufactured by Momentive Performance Materials Japan LLC; KER-6020, KER-6150, KER-6075, KER-2700, KER-2600, KER-2500, KER-2450, KER-2400, and KER-2300, which are methyl silicone resin sealants manufactured by Shin-Etsu Chemical Co., Ltd.; and SCR-1011, SCR-1012, SCR-1016, ASP-1111, ASP-1120, ASP-1031, ASP-1040, KER-6150, KER-6075, and KER-6100, which are phenyl silicone resin sealants or methyl phenyl silicone resin sealants manufactured by Shin-Etsu Chemical Co., Ltd., and the like can be mentioned.

As the polycondensation type silicone resin, for example, a resin having a silicone resin obtained by hydrolysis and polycondensation of a compound represented by a formula (1) as a main component (that is, the silicone resin contains more than 50% by weight with respect to the polycondensation type silicone resin) can be mentioned.

$$R^1{}_n Si(OR^2)_{(4-n)} \qquad (1)$$

[In the formula, $R^1$ represents an alkyl group having 1 to 10 carbon atoms which may have a substituent, or an aryl group having 6 to 10 carbon atoms which may have a substituent; $R^2$ represents an alkyl group having 1 to 10 carbon atoms which may have a substituent, an aryl group having 6 to 10 carbon atoms which may have a substituent, or a hydrogen atom; and n represents an integer of 0 to 4.]

The alkyl group represented by $R^1$ or $R^2$ may be linear or branched, or may have a cyclic structure. The alkyl group preferably has 1 to 6 carbon atoms, and more preferably 1 to 3 carbon atoms. In the alkyl group, one or two or more hydrogen atoms constituting the group may be substituted with a substituent. Examples of the substituent include an aryl group having 6 to 10 carbon atoms such as a phenyl group and a naphthyl group, and a halogen atom such as a fluorine atom and a chlorine atom.

Examples of the alkyl group represented by $R^1$ or $R^2$ include unsubstituted alkyl groups such as a methyl group, an ethyl group, an n-propyl group, an isopropyl group, an n-butyl group, an isobutyl group, a tert-butyl group, an n-pentyl group, a neopentyl group, a hexyl group, an octyl group, a nonyl group, and a decyl group; and substituted alkyl groups such as aralkyl groups including a phenylmethyl group, a 1-phenylethyl group, a 2-phenylethyl group, and a phenylpropyl group.

The number of carbon atoms of the aryl group represented by $R^1$ or $R^2$ is preferably from 6 to 10. In the aryl group, one or two or more hydrogen atoms constituting the group may be substituted with a substituent. Examples of the substituent of the aryl group include an alkyl group having 1 to 6 carbon atoms such as a methyl group, an ethyl group, a propyl group and a butyl group, and a halogen atom such as a fluorine atom and a chlorine atom.

Examples of the aryl group represented by $R^1$ or $R^2$ include unsubstituted aryl groups such as a phenyl group and a naphthyl group, and substituted aryl groups such as alkylaryl groups including alkylphenyl groups such as a methylphenyl group, an ethylphenyl group, and a propylphenyl group.

n is preferably 1 because the hardness and heat resistance of the obtained film are improved.

Commercially available products can also be used as the polycondensation type silicone resin. More specifically, for example, YSL-00 series (manufactured by The Yokohama Rubber Co., Ltd.) can be mentioned.

Examples of the dual type silicone resin include YSL-300F and YSL-350F, which are methyl silicone resin sealants manufactured by The Yokohama Rubber Co., Ltd., and YSH-600F and YSH-650F, which are phenyl silicone resins manufactured by The Yokohama Rubber Co., Ltd.

In one aspect, the weight average molecular weight of silicone is preferably from 1,000 to 10,000, and more preferably from 1,500 to 5,000 in terms of polystyrene. Further, the number average molecular weight of silicone is preferably from 500 to 5,000, and more preferably from 800 to 3,000 in terms of polystyrene.

One type of the binder may be used alone, or two or more types thereof may be used in combination.

The content of the binder in the composition of the present embodiment is preferably from 0.9 to 11% by weight with respect to the total weight of the composition.

(Solvent)

The composition of the present invention may further contain a solvent since the coating properties can be improved. Examples of the solvent include water and organic solvents. The solvent may be appropriately selected in accordance with the solubility of the binder. When using an alkali silicate as a binder, it is preferable to use water as a solvent. When using an addition polymerization type silicone resin, a polycondensation type silicone resin or a dual type silicone resin as a binder, it is preferable to use an organic solvent as a solvent. As the organic solvent, glycol ethers and glycol esters are preferable, and glycol esters are more preferable.

That is, in one aspect, the solvent is preferably water or a glycol ester.

Examples of the glycol ether include ethylene glycol alkyl ethers such as ethylene glycol monomethyl ether, ethylene glycol monoethyl ether, ethylene glycol monoisopropyl ether, ethylene glycol monobutyl ether, ethylene glycol monohexyl ether, and ethylene glycol monoethylhexyl ether; ethylene glycol aryl ethers such as ethylene glycol monophenyl ether and ethylene glycol monobenzyl ether; diethylene glycol monoalkyl ethers such as diethylene glycol monomethyl ether, diethylene glycol monoethyl ether, diethylene glycol monoisopropyl ether, diethylene glycol monobutyl ether, diethylene glycol monohexyl ether, and diethylene glycol monoethylhexyl ether; diethylene glycol aryl ethers such as diethylene glycol monophenyl ether and diethylene glycol monobenzyl ether; propylene glycol alkyl ethers such as propylene glycol monomethyl ether, propylene glycol monoethyl ether, propylene glycol monoisopropyl ether, propylene glycol monobutyl ether, propylene glycol monohexyl ether and propylene glycol monoethylhexyl ether; propylene glycol aryl ethers such as propylene glycol monophenyl ether and propylene glycol monobenzyl ether; dipropylene glycol alkyl ethers such as dipropylene glycol monomethyl ether, dipropylene glycol monoethyl ether, dipropylene glycol monoisopropyl ether, dipropylene glycol monobutyl ether, dipropylene glycol monohexyl ether and dipropylene glycol monoethylhexyl ether; and dipropylene glycol aryl ethers such as dipropylene glycol monophenyl ether and dipropylene glycol monobenzyl ether. Among these, ethylene glycol alkyl ethers, diethylene glycol alkyl ethers, and dipropylene glycol alkyl ethers are preferable; and ethylene glycol monobutyl ether, diethylene glycol monobutyl ether, and dipropylene glycol monomethyl ether are more preferable.

Examples of the glycol ester include ethylene glycol alkyl ether acetates such as ethylene glycol monoethyl ether acetate, ethylene glycol monoisopropyl ether acetate, ethylene glycol monobutyl ether acetate (may be abbreviated as EGBEA), ethylene glycol monohexyl ether acetate and ethylene glycol monoethylhexyl ether acetate; and ethylene glycol aryl ether acetates such as ethylene glycol monophenyl ether acetate and ethylene glycol monobenzyl ether acetate. Among these, ethylene glycol alkyl ether acetates are preferable, and ethylene glycol monobutyl ether acetate is more preferable.

In the composition according to an embodiment of the present invention, the content of the solvent is from 50 parts by weight to 25,000 parts by weight with respect to the content of 100 parts by weight of the binder, and is preferably from 100 parts by weight to 2,000 parts by weight, and more preferably from 150 parts by weight to 200 parts by weight, since it is possible to suppress generation of air bubbles at the time of curing and to improve adhesion. In another aspect, the content of the solvent may be from 161 parts by weight to 1,900 parts by weight with respect to the content of 100 parts by weight of the binder.

One type of the solvent may be used alone, or two or more types thereof may be used in combination.

In one aspect, the content of the solvent in the composition of the present embodiment is preferably from 0 to 20% by weight with respect to the total weight of the composition.

(Inorganic Compound)

The composition according to an embodiment of the present invention preferably further includes an inorganic compound other than the variable thermal conductivity material and the binder because the hardness, durability and adhesion of the film are improved. The inorganic compound referred to here is an inorganic compound that does not satisfy the conditional expression 1, and examples thereof include oxides and inorganic acids that do not satisfy the conditional expression 1. Examples of the oxide that does not satisfy the conditional expression 1 include silica, alumina and zirconia, and silica is preferable since the rate of change in thermal conductivity ($\kappa_{max}/\kappa_{25}$) of the film can be increased. Examples of the inorganic acid that does not satisfy the conditional expression 1 include phosphoric acid. The inorganic acid may act as a curing catalyst.

That is, in one aspect, the inorganic compound other than the variable thermal conductivity material and the binder is preferably at least one inorganic compound selected from the group consisting of silica, alumina, zirconia and phosphoric acid, and more preferably silica or phosphoric acid.

Examples of the shape of the inorganic compound include particle-like shapes, needle-like shapes, fiber-like shapes and plate-like shapes, and particle-like shapes (particularly spherical shapes) are preferable. The inorganic compound has a median diameter measured by a laser diffraction method of 10 nm to 100 μm, preferably from 100 nm to 50 μm, and more preferably from 5 μm to 15 μm.

The inorganic compound has a BET specific surface area of 0.1 to 500 m$^2$/g, preferably from 0.5 to 50 m$^2$/g, and more preferably from 1 to 5 m$^2$/g.

In the composition of the present invention, the content of the inorganic compound is preferably from 0.1 parts by weight to 600 parts by weight, more preferably from 10 parts by weight to 550 parts by weight, and still more preferably from 200 parts by weight to 530 parts by weight with respect to 100 parts by weight of the binder. In another aspect, the content of the inorganic compound may be from 0.45 parts by weight to 523 parts by weight with respect to 100 parts by weight of the binder.

The content of the inorganic compound other than the variable thermal conductivity material and the binder in the composition of the present embodiment is preferably from 0 to 50% by weight with respect to the total weight of the composition. One type of the inorganic compounds may be used alone, or two or more types thereof may be used in combination.

(Mixing of Composition)

When preparing a composition according to an embodiment of the present invention, a homogeneous composition can be obtained by undergoing a mixing step. Examples of mixing methods used in the mixing step include a ball mill method, a rotation/revolution mixer method, an impeller rotation method, a blade rotation method, a thin film rotation method, a rotor/stator mixer method, a colloid mill method, a high pressure homogenizer method, and an ultrasonic dispersion method. In the mixing step, a plurality of mixing methods may be performed sequentially, or a plurality of mixing methods may be performed simultaneously.

In the mixing step, by homogenizing and shearing the composition, the fluidity and deformability of the composition can be improved.

<Film>

The film according to an embodiment of the present invention is a film obtained by curing the above composition. Curing can be performed by the method described in the method for producing a film described later.

The content of the variable thermal conductivity material in the film of the present embodiment is preferably 50% by weight or more, more preferably 70% by weight or more, and still more preferably 80% by weight or more with respect to the weight of the entire film (total weight). By filling the variable thermal conductivity material to 50% by weight or more of the weight of the entire film, the rate of change in the thermal conductivity of the film tends to be close to the rate of change in the thermal conductivity of the variable thermal conductivity material. Further, it is preferable that content of the variable thermal conductivity material in the film is 99% by weight or less with respect to the weight of the entire film.

That is, in one aspect, the content of the variable thermal conductivity material in the film of the present embodiment is preferably 50% by weight or more and 99% by weight or less, more preferably 70% by weight or more and 99% by weight or less, and still more preferably 80% by weight or more and 99% by weight or less with respect to the weight of the entire film (total weight of the film).

The content of the binder in the film of the present embodiment is preferably 0.9% by weight or more and 11% by weight or less.

The thickness of the film is from 10 μm to 10 mm, and preferably from 100 μm to 3 mm.

The phrase "thickness of the film" as used herein is a height of the thinnest surface of the film, and when the film is placed on a base material, it means a height from the interface between the base material and the film to the surface of the film. The thickness of the film can be measured using, for example, an electromagnetic film thickness meter, an eddy current film thickness meter, an ultrasonic film thickness meter, a thickness gauge, a micrometer or a caliper, or can be measured using a cross-sectional image taken using a scanning electron microscope.

In one aspect, in the film according to an embodiment of the present invention, a "retention rate of the change rate of thermal conductivity" expressed by a ratio of a rate of change in the thermal conductivity of the film with respect to a rate of change in the thermal conductivity of the variable thermal conductivity material is preferably from 40 to 100%, more preferably from 50 to 90%, and still more preferably from 55 to 77%. The "retention rate of the change rate of thermal conductivity" can be determined by the method described in the section entitled [Measurement of thermal conductivity of film] described later.

In another aspect, the film according to an embodiment of the present invention preferably has an adhesion of 0.20 to 10 MPa, more preferably from 0.30 to 1 MPa, and still more preferably from 0.33 to 0.57 MPa. The "adhesion" can be evaluated by, for example, an adhesion measuring instrument PosiTest (manufactured by Honda Business Systems Ltd.) using a film formed on a base material in accordance with the method described in the section entitled [Evaluation of adhesion] described later.

<Heat Flow Control Member>

According to the composition which is an embodiment of the present invention, for example, a heat flow control member having a film formed on a base material can be obtained by curing the composition on the base material. That is, the heat flow control member according to an embodiment of the present invention includes a base material and the film according to an embodiment of the present invention. Curing can be performed, for example, at a low temperature of 80° C. or higher and 200° C. or lower. As the base material, for example, base materials composed of metals such as aluminum, iron and stainless steel, ceramics such as alumina, glass, and organic materials such as acrylic resins and polyethylene terephthalate can be mentioned.

The shape of the base material is not particularly limited, but for example, a flat surface or a curved surface is preferable.

The thickness of the base material is preferably, for example, from 0.01 to 50 mm.

FIG. 1 showing an embodiment of a heat flow control member of the present invention is a diagram showing an embodiment in which a film 2 of the present invention is formed in a peripheral portion of a pipe (also referred to as heat flow pipe) 1 through which a thermal fluid passes.

In the heat flow control member according to an embodiment of the present invention, it is preferable that the base material contains a compound that satisfies the conditional expression 2.

The base material may be composed of only a compound satisfying the conditional expression 2, or may be composed of a plurality of layers including a layer composed of a compound satisfying the conditional expression 2.

In one aspect, the base material may have a structure including a first layer and a second layer composed of a compound satisfying the conditional expression 2.

In one aspect, in the heat flow control member of the present invention, it is more preferable that the base material is configured of the first layer and the second layer composed of a compound satisfying the conditional expression 2, and that the first layer is in contact with the film of the present invention. In another aspect, in the heat flow control member of the present invention, the base material may be configured of a first layer and a second layer composed of a compound satisfying the conditional expression 2, and have a structure in which the film of the present invention and the second layer are brought into contact. By forming such a structure, it becomes possible to exhibit diode characteristics in which heat is easily conducted from the side of the film of the present invention to the second layer side, but is difficult to be conducted from the second layer side to the side of the film of the present invention.

It should be noted that the term "first layer" as used herein means a layer composed of a compound that does not satisfy the conditional expression 2.

Furthermore, in another aspect, the heat flow control member of the present invention may have a structure including a base material containing a compound satisfying the conditional expression 2, the film of the present invention formed on the base material, and a second layer composed of a compound satisfying the conditional expression 2 which is further formed on the film.

In the present specification, the "compound satisfying the conditional expression 2" is a compound satisfying a condition of $0 \leq \kappa_{max}/\kappa_{25} \leq 0.8$, and the value of $\kappa_{max}/\kappa_{25}$ preferably satisfies a condition of $0.05 \leq \kappa_{max}/\kappa_{25} \leq 0.6$, more preferably satisfies a condition of $0.1 \leq \kappa_{max}/\kappa_{25} \leq 0.5$, and still more preferably satisfies a condition of $0.2 \leq \kappa_{max}/\kappa_{25} \leq 0.4$. Examples of the compound that satisfies the conditional expression 2 include alumina, $ZrO_2$, and chalcogenide (for example, $CuGaTe_2$).

Examples of the method for coating the composition of the present invention onto the base material include printing methods such as screen printing, gravure printing, and lithographic printing. Further, when coating the composition of the present invention onto a base material, it can be carried out using a known coating device. Examples of known coating devices include a reverse roll coater, a blade coater, a slit die coater, a direct gravure coater, an offset gravure coater, a kiss coater, a natural roll coater, an air knife coater, a roll blade coater, a burr-bar roll blade coater, a two stream coater, a rod coater, a wire bar coater, an applicator, a dip coater, a curtain coater, a spin coater, and a knife coater.

<Method for Producing Film>

The film according to an embodiment of the present invention may be produced by any method, but when the composition of the present invention contains a solvent, it can be produced, for example, by evaporating the solvent from the composition, followed by crosslinking and curing.

The crosslinking reaction may be performed, for example, by thermally curing the composition of the present invention or by ultraviolet curing.

In an embodiment of the present invention, the film of the present invention can be produced by the following two steps.

It should be noted that a step of coating a composition onto a base material may be performed before the first step.

(1) A first step of obtaining a non-crosslinked film by evaporating the solvent in the composition.

(2) A second step of obtaining the film of the present invention (for example, a crosslinked film) by heating the non-crosslinked film obtained in the first step and allowing the crosslinking reaction to proceed.

In the first step, for example, a non-crosslinked film can be obtained by holding the composition at a temperature equal to or lower than the boiling point of the solvent and evaporating the solvent in the composition.

In the second step, for example, the film of the present invention (for example, a crosslinked film) can be obtained by heating and holding (for example, holding for 0.1 to 24 hours) the non-crosslinked film obtained in the first step at a temperature equal to or higher than the boiling point of the solvent and allowing the crosslinking reaction to proceed (crosslinking and curing).

According to such a method, it is possible to obtain a film in which the generation of air bubbles is suppressed and the heat resistance is excellent.

In one aspect, the method for producing a film of the present invention includes:
coating a composition to a base material;
obtaining a non-crosslinked film by evaporating a solvent in the aforementioned composition (first step); and
obtaining a crosslinked film by heating the aforementioned non-crosslinked film obtained and allowing a crosslinking reaction to proceed (second step).

Furthermore, the aforementioned production method may include, before coating the aforementioned composition to the aforementioned base material, obtaining the aforementioned composition by mixing a binder, a variable thermal conductivity material satisfying the conditional expression 1, and if required, a solvent and at least one component selected from the group consisting of an inorganic compound other than the aforementioned binder and the aforementioned variable thermal conductivity material.

In one aspect, the composition according to an embodiment of the present invention is:
a composition including a binder, a variable thermal conductivity material, and if required, a solvent and at least one component selected from the group consisting of an inorganic compound other than the aforementioned binder and the aforementioned variable thermal conductivity material; wherein
the aforementioned binder is an alkali silicate or silicone;
the aforementioned variable thermal conductivity material is:
an inorganic compound satisfying a condition of: $1.2 \leq \kappa_{max}/\kappa_{25} \leq 100$, preferably $1.5 \leq \kappa_{max}/\kappa_{25} \leq 100$, more preferably $2.0 \leq \kappa_{max}/\kappa_{25} \leq 100$, and still more preferably $2.4 \leq \kappa_{max}/\kappa_{25} \leq 100$, or $2.1 \leq \kappa_{max}/\kappa_{25} \leq 2.7$ when the thermal conductivity at 25° C. is defined as $\kappa_{25}$ and the maximum value of the thermal conductivity at 200° C. or 500° C. is defined as $\kappa_{max}$,
and is preferably at least one compound selected from the group consisting of metal oxides and composite metal oxides that satisfy the aforementioned condition of $\kappa_{max}/\kappa_{25}$,
more preferably $LaCoO_3$, $La_{0.95}Sr_{0.05}CoO_3$ and $La_{0.90}Sr_{0.10}CoO_3$ that satisfy the aforementioned condition of $\kappa_{max}/\kappa_{25}$;
the aforementioned solvent is water or a glycol ester, and preferably water or ethylene glycol monobutyl ether acetate (EGBEA);
the inorganic compound other than the aforementioned binder and the aforementioned variable thermal conductivity material is an oxide and inorganic acid that do not satisfy the aforementioned condition of $\kappa_{max}/\kappa_{25}$, and preferably at least one compound selected from the group consisting of phosphoric acid, silica, alumina, and zirconia that do not satisfy the aforementioned condition of $\kappa_{max}/\kappa_{25}$;

a content of the aforementioned binder is preferably from 0.9 to 11% by weight with respect to the total weight of the aforementioned composition;

a content of the aforementioned variable thermal conductivity material is from 300 parts by weight to 10,000 parts by weight, preferably from 500 parts by weight to 9,000 parts by weight, more preferably from 510 parts by weight to 1,200 parts by weight, and still more preferably from 800 parts by weight to 1,100 parts by weight, or may be from 520 parts by weight to 8,330 parts by weight with respect to a content of 100 parts by weight of the aforementioned binder;

when the aforementioned solvent is contained, a content of the aforementioned solvent is from 50 parts by weight to 25,000 parts by weight, preferably from 100 parts by weight to 2,000 parts by weight, and more preferably from 150 parts by weight to 200 parts by weight, or may be from 161 parts by weight to 1,900 parts by weight with respect to a content of 100 parts by weight of the aforementioned binder; and when the inorganic compound other than the aforementioned binder and the aforementioned variable thermal conductivity material is contained, a content of the inorganic compound other than the aforementioned binder and the aforementioned variable thermal conductivity material is from 0.1 parts by weight to 600 parts by weight, more preferably from 10 parts by weight to 550 parts by weight, still more preferably from 200 parts by weight to 530 parts by weight, or from 0.45 parts by weight to 523 parts by weight with respect to a content of 100 parts by weight of the aforementioned binder.

In another aspect, the heat flow control member according to an embodiment of the present invention is a heat flow control member including:

a film formed by curing the aforementioned composition and a base material;

wherein the aforementioned base material contains a compound satisfying a condition of: $0 \leq \kappa_{max}/\kappa_{25} \leq 0.8$, preferably $0.05 \leq \kappa_{max}/\kappa_{25} \leq 0.6$, more preferably $0.1 \leq \kappa_{max}/\kappa_{25} \leq 0.5$, and still more preferably $0.2 \leq \kappa_{max}/\kappa_{25} \leq 0.4$ when the thermal conductivity at 25° C. is defined as $\kappa_{25}$ and the minimum value of the thermal conductivity at 200° C. or 500° C. is defined as $\kappa_{min}$, and preferably contains at least one compound selected from the group consisting of alumina, $ZrO_2$ and chalcogenide satisfying the aforementioned condition of $\kappa_{max}/\kappa_{25}$, a thickness of the aforementioned base material is from 0.01 to 50 mm, and a thickness of the aforementioned film is from 0 μm to 10 mm, and preferably from 100 μm to 3 mm.

Examples

The present invention will be described below based on examples. However, the present invention is not limited to these examples. It should be noted that in the examples, the properties of each material and the like were evaluated by the following methods.

[Production of Variable Thermal Conductivity Material]

Materials (A): $LaCoO_3$, (B): $La_{0.95}Sr_{0.05}CoO_3$, and (C): $La_{0.90}Sr_{0.10}CoO_3$ were produced by the method shown below as variable thermal conductivity materials. As raw material powders, $La_2O_3$, $SrCO_3$, and $Co_3O_4$ were weighed to have weights as shown in Table 1 and mixed in a mortar to obtain a raw material mixed powder. The obtained raw material mixed powder was placed into a crucible and fired at 1,000° C. for 10 hours in an electric furnace in an air atmosphere to obtain a calcined material. A calcined material powder obtained by pulverizing the calcined material in a mortar was placed in a crucible and fired in an electric furnace in an air atmosphere at 1,400° C. for 10 hours to obtain a sintered body. The sintered body was pulverized in a mortar to obtain a variable thermal conductivity material powder.

When the specific surface area of the variable thermal conductivity material powder was measured using a BET specific surface area measuring device (Macsorb HM-Model 1201 manufactured by Mountech Co., Ltd.), it was 0.18 $m^2/g$ for the material (A), 0.14 $m^2/g$ for the material (B), and 0.21 $m^2/g$ for the material (C). The variable thermal conductivity material powder was dried at 150° C. for 30 minutes in a nitrogen atmosphere, and then the specific surface area was measured.

When the median diameter of the variable thermal conductivity material powder was measured using a laser diffraction particle size distribution measuring apparatus (Mastersizer 2000 manufactured by Malvern Instruments Ltd.), it was 17 μm, 24 μm, and 20 μm for the variable thermal conductivity materials (A), (B) and (C), respectively. The variable thermal conductivity material powder was dispersed in pure water using an ultrasonic dispersion device, and then the particle size distribution was measured.

A green compact was formed by applying pressure to the variable thermal conductivity material powder with a uniaxial pressing machine. The obtained green compact was heated at 1,400° C. for 10 hours in an electric furnace in an air atmosphere to obtain a thermal conductivity variable pellet. The shape of the thermal conductivity variable pellet was adjusted so as to have a diameter of 10 mm and a height of 1 mm. The thermal conductivity of the variable thermal conductivity material was measured using the thermal conductivity variable pellet. The results are shown in Table 1.

[Measurement of Thermal Conductivity of Variable Thermal Conductivity Material]

For measurement of the thermal conductivity of the variable thermal conductivity material, a thermal conductivity variable pellet which was pelletized to a diameter of 10 mm and a height of 1 mm was used. The thermal diffusivity $\lambda_T$ and heat capacity $C_{pT}$ of the thermal conductivity variable pellet at 25° C., 200° C., and 500° C. were measured using a laser flash apparatus (LFA457 MicroFlash manufactured by NETZSCH-Geratebau GmbH) under the following conditions, and the density d was measured by the Archimedes method. A thermal conductivity $\kappa_T$ at a predetermined temperature T was calculated in accordance with the formula: $\kappa_T = \lambda_T \times C_{pT} \times d$.

Table 4 shows the results of thermal conductivity of the variable thermal conductivity material measured using the thermal conductivity variable pellet.

(Conditions)

Measuring method: laser flash method

Measuring device: LFA457 MicroFlash, manufactured by NETZSCH-Geratebau GmbH

Laser: 1,064 nm (irradiation wavelength), 15 J/pulse, 1 ms±0.5 ms (delay), 330 μs (pulse length)

Detector: InSb (liquid nitrogen cooling)

Sample shape: 10 mm (diameter), 1 mm (thickness)

Pretreatment: coating of sample surface with graphite spray

Purge gas: nitrogen gas flow

Reference: Pyroceram 9606, 10 mm (diameter), 2 mm (thickness)

Analytical model: Cowan model

Density measurement: Archimedes method

TABLE 1

| Variable thermal conductivity material | Composition | $La_2O_3$ (g) | $SrCO_3$ (g) | $Co_3O_4$ (g) | Pellet $\kappa_{25}$ | $\kappa_{max}$ | $\kappa_{max}/\kappa_{25}$ |
|---|---|---|---|---|---|---|---|
| (A) | $LaCoO_3$ | 33.30 | — | 16.30 | 1.60 | 3.50 | 2.2 |
| (B) | $La_{0.95}Sr_{0.05}CoO_3$ | 117.33 | 5.51 | 87.60 | 1.64 | 4.38 | 2.7 |
| (C) | $La_{0.90}Sr_{0.10}CoO_3$ | 36.55 | 3.68 | 20.02 | 1.70 | 4.21 | 2.5 |

[Production of Composition]

A composition containing a binder and a variable thermal conductivity material was produced by the method shown below.

In Examples 1 to 9 and Comparative Examples 1 and 2, (A) $LaCoO_3$, (B) $La_{0.95}Sr_{0.05}CoO_3$ or (C) $La_{0.90}Sr_{0.10}CoO_3$ was used as the variable thermal conductivity material, a sodium silicate solution (sodium silicate solution (Wako first grade reagent), $SiO_2/Na_2O$=2.06-2.31, concentration: 52-57% by weight, manufactured by Wako Pure Chemical Industries, Ltd.) was used as the binder, water (ion exchanged water, boiling point: 100° C.) was used as a solvent, and spherical silica Z (silica particles; EXCELICA SE-8 manufactured by Tokuyama Corporation) was used as an inorganic compound. The spherical silica Z had a BET specific surface area of 1.2 m²/g and a median diameter of 10 μm.

In Example 10, the material (B) $La_{0.95}Sr_{0.05}$ $CoO_3$ was used as the variable thermal conductivity material, a silicone resin X was used as the binder, EGBEA (boiling point: 192° C.) was used as the solvent, and phosphoric acid was used as the inorganic compound.

Here, the silicone resin X is a polymer compound composed of structural units of the types and ratios represented by the following formula and having a weight average molecular weight of 3,500 in terms of polystyrene and a number average molecular weight of 1,600 in terms of polystyrene. It should be noted that the silicone resin X is a polycondensation type silicone resin represented by an average compositional formula of $(CH_3)Si(OH)_{0.15}(OCH_3)_{0.08}O_{1.39}$.

TABLE 2

| Repeating unit | $\left(\begin{array}{c} OCH_3 \\ | \\ Si-O \\ | \\ CH_3 \end{array}\right)$ | $\left(\begin{array}{c} OH \\ | \\ Si-O \\ | \\ CH_3 \end{array}\right)$ | $\left(\begin{array}{c} Si \\ | \\ O \\ | \\ Si-O \\ | \\ CH_3 \end{array}\right)$ |
|---|---|---|---|
| Abundance ratio | 0.08 | 0.15 | 0.77 |

In Examples 1 to 10 and Comparative Examples 1 and 2, each of the binder, the variable thermal conductivity material powder, the solvent and the inorganic compound were used at the weight ratios shown in Table 3. The composition was obtained by stirring these until it was possible to confirm homogeneity by visual observation and then mixing using a rotation-revolution mixer.

[Production of Film]

The obtained composition was coated on an aluminum plate. For coating, an applicator (film applicator with a micrometer manufactured by Tester Sangyo Co., Ltd.) and an automatic coating apparatus (PI-1210 manufactured by Tester Sangyo Co., Ltd.) were used. The coating clearance was 500 μm, and the coating speed was 15 mm/s. Subsequently, the composition coated on the aluminum plate was placed in a dryer (air-blowing constant temperature thermostat DKN302 manufactured by Yamato Scientific Co., Ltd.), heated to 80° C. and held for 30 minutes, and then further held for 1 hour by raising the temperature to 150° C. to produce a film. Using the obtained film, coating film cracking and adhesion were evaluated. The results are shown in Table 4.

[Measurement of Thermal Conductivity of Film]

The obtained composition was poured into a mold in which a 10 mm×10 mm frame having a thickness of 1 mm or more was formed with silicone containing an iron powder on a polyethylene naphthalate film. This composition was placed in a dryer (air-blowing constant temperature thermostat DKN302 manufactured by Yamato Scientific Co., Ltd.), heated to 80° C. and held for 30 minutes, and then further held for 1 hour by raising the temperature to 150° C. to cure the composition. As a result, a film having a size of 10 mm×10 mm and a thickness of 1 mm was produced. The temperature dependence of the thermal conductivity was measured using the obtained film, and the rate of change of the thermal conductivity ($\kappa_{max}/\kappa_{25}$) of the film was evaluated.

The thermal diffusivity λ and heat capacity $C_p$ of the obtained film at 25° C., 200° C., and 500° C. were measured using a laser flash apparatus (LFA457 MicroFlash manufactured by NETZSCH-Geratebau GmbH) under the following conditions, and the density d was measured by the Archimedes method. A thermal conductivity $\kappa_T$ at a predetermined temperature T was calculated in accordance with the formula: $\kappa_T = \lambda_T \times C_{pT} \times d$. Table 4 shows the results of thermal conductivity measured using the obtained film.

A ratio $R_{MX}/R_{ST}$ of a change rate $R_{MX}$ of the thermal conductivity of the film with respect to a change rate $R_{ST}$ of the thermal conductivity of the variable thermal conductivity material was calculated and taken as the retention rate of the change rate of thermal conductivity. The results are shown in Table 4.

(Conditions)

Measuring method: laser flash method

Measuring device: LFA457 MicroFlash, manufactured by NETZSCH-Geratebau GmbH

Laser: 1,064 nm (irradiation wavelength), 15 J/pulse, 1 ms±0.5 ms (delay), 330 μs (pulse length)

Detector: InSb (liquid nitrogen cooling)

Sample shape: 10 mm×10 mm, 1 mm (thickness)

Pretreatment: coating of sample surface with graphite spray

Purge gas: nitrogen gas flow

Reference: Pyroceram 9606, 10 mm (diameter), 2 mm (thickness)

Analytical model: Cowan model

Density measurement: Archimedes method

[Evaluation of Shape Processability]

The surface of the film formed on the aluminum plate was visually observed, and those that could be uniformly and evenly coated were evaluated as satisfactory and described as "A", and those in which a crack larger than 1 mm was present were evaluated as unsatisfactory and described as "C". The results are shown in Table 4.

[Evaluation of Adhesion]

For the evaluation of adhesion, a film formed on an aluminum plate was used and evaluated using an adhesion measuring instrument PosiTest (manufactured by Honda Business Systems Ltd.).

A dedicated dolly (size: 20 mm in diameter) was adhered to the surface of the film formed on the aluminum plate with an adhesive (Aron Alpha for professional use, impact resistant, manufactured by Toagosei Co., Ltd.), and the peel strength was measured with the adhesion measuring instrument to evaluate adhesion. The detection limit of peel strength was 0.25 MPa. It was evaluated that favorable peel strength was obtained when the peel strength was 0.3 MPa or more. The results are shown in Table 4.

TABLE 4

| | Shape process-ability | Adhesion (MPa) | Pellet $\kappa_{25}$ | Pellet $\kappa_{max}$ | Film $\kappa_{25}$ | Film $\kappa_{max}$ | Retention rate (%) |
|---|---|---|---|---|---|---|---|
| Comparative Example 1 | A | Less than detection limit | 1.64 | 4.38 | 0.56 | 0.76 | 40 |
| Example 1 | A | 0.39 | 1.64 | 4.38 | 0.54 | 0.82 | 57 |
| Example 2 | A | 0.33 | 1.64 | 4.38 | 0.59 | 0.86 | 55 |
| Example 3 | A | 0.39 | 1.60 | 3.50 | 0.90 | 1.52 | 77 |
| Example 4 | A | 0.47 | 1.64 | 4.38 | 0.88 | 1.46 | 60 |
| Example 5 | A | 0.57 | 1.70 | 4.21 | 0.88 | 1.61 | 74 |
| Example 6 | A | 0.40 | 1.64 | 4.38 | 0.97 | 1.62 | 63 |
| Example 7 | A | 0.47 | 1.64 | 4.38 | 1.14 | 1.97 | 65 |
| Example 8 | A | 0.42 | 1.64 | 4.38 | 1.08 | 1.71 | 59 |
| Example 9 | A | 0.57 | 1.64 | 4.38 | 0.92 | 1.41 | 57 |
| Comparative Example 2 | C | Less than detection limit | 1.64 | 4.38 | 0.84 | 1.13 | 51 |
| Example 10 | A | 0.44 | 1.64 | 4.38 | 0.62 | 0.80 | 48 |

INDUSTRIAL APPLICABILITY

According to the present invention, it is possible to provide a composition having excellent adhesion to an object to be applied, and also excellent shape processability, a film, and a method for producing a film. Since the composition and film of the present invention are useful for applications and the like exposed to high temperatures, such as peripheral members of heat exhausting portions of automobiles, peripheral members of high temperature portions of batteries such as lithium ion batteries, peripheral members of heat exhausting portions of boilers, peripheral members of pipes through which thermal fluid passes, peripheral members of heat exhausting portions of optical members such as lasers and LEDs, outdoor products for carrying out heating with a flame, and members of cooking utensils, the present invention is industrially useful.

TABLE 3

| | Variable thermal conductivity material (parts by weight) | Binder (parts by weight) | Solvent (parts by weight) | Inorganic compound (parts by weight) |
|---|---|---|---|---|
| Comparative Example 1 | (B) 12,500 | Sodium silicate 100 | Water 2,900 | None |
| Example 1 | (B) 8,330 | Sodium Silicate 100 | Water 1,900 | None |
| Example 2 | (B) 6,250 | Sodium silicate 100 | Water 1,400 | None |
| Example 3 | (A) 1,040 | Sodium silicate 100 | Water 163 | None |
| Example 4 | (B) 1,040 | Sodium silicate 100 | Water 163 | None |
| Example 5 | (C) 1,040 | Sodium silicate 100 | Water 163 | None |
| Example 6 | (B) 820 | Sodium silicate 100 | Water 162 | None |
| Example 7 | (B) 820 | Sodium silicate 100 | Water 161 | Spherical silica Z 208 |
| Example 8 | (B) 660 | Sodium silicate 100 | Water 165 | Spherical silica Z 388 |
| Example 9 | (B) 520 | Sodium silicate 100 | Water 177 | Spherical silica Z 523 |
| Comparative Example 2 | (B) 120 | Sodium silicate 100 | Water 222 | Spherical silica Z 898 |
| Example 10 | (B) 1,320 | Silicone resin X 100 | EGBEA 113 | Phosphoric acid 0.45 |

REFERENCE SIGNS LIST

1: Heat flow pipe;
2: Film of the present invention

The invention claimed is:

1. A composition comprising:
    a binder and
    a variable thermal conductivity material satisfying a conditional expression 1,
    wherein a content of said variable thermal conductivity material is from 300 parts by weight to 10,000 parts by weight with respect to a content of 100 parts by weight of said binder:

$$\kappa_{max}/\kappa_{25} \geq 1.2 \qquad \text{[conditional expression 1]}$$

wherein, $\kappa_{25}$ represents a thermal conductivity at 25° C., and $\kappa_{max}$ represents the maximum value of a thermal conductivity at 200° C. or 500° C.,
    wherein the thermal conductivity material comprises at least one oxide selected from the group consisting of metal oxides represented by MyOz, and composite metal oxides represented by AxMyOz,
    in which
        A represents at least one element selected from the group consisting of alkali metals, alkaline earth metals, Sc, Y and rare earth elements,
        M represents at least one metal element selected from titanium, vanadium, manganese, cobalt, or nickel,
        x, y and z each independently represent a positive number, and
    wherein the thermal conductivity material comprises particles having a median diameter from 10 nm to 100 μm.

2. The composition according to claim 1, wherein said binder is a silicone or an alkali silicate.

3. The composition according to claim 1, further comprising an inorganic compound other than said binder and said variable thermal conductivity material.

4. The composition according to claim 1, further comprising a solvent.

5. A film obtained by curing the composition according to claim 1.

6. A heat flow control member comprising a base material and the film according to claim 5.

7. The heat flow control member according to claim 6, wherein said base material comprises a compound satisfying a conditional expression 2:

$$\kappa_{min}/\kappa_{25} \leq 0.8 \qquad \text{[conditional expression 2]}$$

wherein, $\kappa_{25}$ represents a thermal conductivity at 25° C., and $\kappa_{min}$ represents the minimum value of a thermal conductivity at 200° C. or 500° C.

8. The composition according to claim 1, wherein the binder comprises at least one alkali silicate selected from the group consisting of lithium silicate, sodium silicate, and potassium silicate.

9. The composition according to claim 1, wherein the binder comprises silica glass.

10. The composition according to claim 1, wherein the binder comprises M'$_2$O·nSiO$_2$, in which M' represents an alkali metal and n is a number from 1 to 3.5.

11. The composition according to claim 1, wherein $1.2 \leq \kappa_{max}/\kappa_{25} \leq 100$.

12. The composition according to claim 1, wherein $2.1 \leq \kappa_{max}/\kappa_{25} \leq 2.7$.

13. The composition according to claim 1, wherein the thermal conductivity material comprises at least one inorganic compound selected from the group consisting of alloys, chalcogenides, oxides, silicon carbide, aluminum nitride, silicon nitride, diamond, graphene, graphite, carbon nanotubes and carbon nanowires.

14. The composition according to claim 1, wherein a content of the thermal conductivity material is from 800 parts by weight to 1,100 parts by weight.

15. The composition according to claim 1, wherein the thermal conductivity material comprises at least one oxide selected from the group consisting of La$_{1-x}$Sr$_x$CoO$_3$ and La$_{1-x}$Ca$_x$CoO$_3$, wherein x is a number from 0 to 1.

* * * * *